United States Patent
Nakagawa et al.

(10) Patent No.: US 9,932,232 B2
(45) Date of Patent: Apr. 3, 2018

(54) OZONE GENERATING DEVICE

(71) Applicant: Mitsubishi Electric Corporation, Chiyoda-ku (JP)

(72) Inventors: Yusuke Nakagawa, Chiyoda-ku (JP); Noboru Wada, Chiyoda-ku (JP); Takahisa Nagayama, Chiyoda-ku (JP); Yasutaka Inanaga, Chiyoda-ku (JP); Gaku Oinuma, Chiyoda-ku (JP); Mamiko Yoshida, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/540,122

(22) PCT Filed: Feb. 4, 2016

(86) PCT No.: PCT/JP2016/053356
§ 371 (c)(1),
(2) Date: Jun. 27, 2017

(87) PCT Pub. No.: WO2016/132919
PCT Pub. Date: Aug. 25, 2016

(65) Prior Publication Data
US 2018/0002176 A1    Jan. 4, 2018

(30) Foreign Application Priority Data
Feb. 19, 2015    (JP) .................................. 2015-030316

(51) Int. Cl.
*C01B 13/11* (2006.01)
*C02F 1/78* (2006.01)

(52) U.S. Cl.
CPC ............. *C01B 13/115* (2013.01); *C02F 1/78* (2013.01); *C01B 2201/64* (2013.01); *C01B 2201/74* (2013.01); *C02F 2201/782* (2013.01)

(58) Field of Classification Search
None
See application file for complete search history.

(56) References Cited

U.S. PATENT DOCUMENTS 5,759,497 A    6/1998 Kuzumoto et al.
5,948,374 A    9/1999 Kuzumoto et al.
(Continued)

FOREIGN PATENT DOCUMENTS

JP    63-085003 A    4/1988
JP    10-338507 A    12/1998
(Continued)

OTHER PUBLICATIONS

International Search Report dated Mar. 22, 2016 in PCT/JP2016/053356 filed Feb. 4, 2016.

*Primary Examiner* — Kishor Mayekar
(74) *Attorney, Agent, or Firm* — Oblon, McClelland, Maier & Neustadt, L.L.P.

(57) ABSTRACT

In an ozone generating device including a discharge unit for discharging a material gas that flows through a discharge space formed between two electrodes to generate ozone and a cooling unit for radiating heat which is generated by the discharging, wherein the material gas is obtained by vaporizing a liquefied raw material, the cooling unit includes a first cooling unit through which a first refrigerant flows in contact with one of the two electrodes and a second cooling unit which is provided further to the downstream side of flow of the material gas in the discharge unit than the first cooling unit, and in which the cold heat source is the liquefied raw material and the temperature of the second refrigerant introduced to the second cooling unit is set to be lower than the temperature of the first refrigerant introduced to the first cooling unit.

7 Claims, 14 Drawing Sheets

(56) References Cited

U.S. PATENT DOCUMENTS 6,093,289 A 7/2000 Kuzumoto et al.
6,193,852 B1 2/2001 Caracciolo et al.

FOREIGN PATENT DOCUMENTS

| JP | 3545257 B2 | 7/2004 |
|----|------------|--------|
| JP | 2013-184861 A | 9/2013 |

OZONE GENERATING DEVICE

TECHNICAL FIELD

This invention relates to an ozone generating device which generates ozone by using discharge.

BACKGROUND ART

An ozone generating device which generates ozone ($O_3$) by using discharge will be described. Ozone is utilized as a strong oxidizing agent in a wide variety of fields including an aqueous environment purification technology such as water and sewage treatment, etc., a sterilization technology and a semiconductor cleaning technology, etc. Corresponding to recent growing environmental awareness and increase in demand for electronic devices, demand for technology regarding ozone generation with high concentration and high efficiency is increased.

As a discharge method for generating ozone, mainly a silent discharge method is used. In a silent discharge type ozone generating device, by using discharge, oxygen molecules are dissociated for generating ozone, and in order to enhance an ozone concentration and an efficiency of a silent discharge type ozone generating devices, in every country in the word, research and development has been advanced. In actual ozone generating devices, approximately 10% of input electric power is transformed to be ozone, and remaining 90% of input electric power is transformed to thermal energy in a discharge space. Here, when the thermal energy causes a discharge space to be a high temperature, ozone which is generated is decreased through the thermal decomposition reaction, consequently, the thermal decomposition reaction is one of factors to suppress to enhance an ozone concentration and high efficiency of an ozone generating device. That is, by making a temperature of a discharge space to be low, thermal decomposition of ozone is suppressed, therefore, ozone generating efficiency is improved and high concentration ozone can be generated. Here, the ozone generating efficiency designates ozone weight which can be generated per unit discharge electric power. In conventional ozone generating devices, generally, by using water which is stored in a tank such as a cooling tower, etc. or tap water (hereinafter, will be referred as normal temperature water), electrodes are cooled so as to make a discharge space to be a low temperature. In some cases, electrodes are cooled by directly contacting normal temperature water, and in other cases, cooling water at a side of an ozone generating device is circulated in a closed path, by heat exchange between the normal temperature water, a temperature of the cooling water is maintained. In either case, a temperature of the normal temperature water is approximately 25 degrees Celsius, and it is found such that by using water whose temperature is lower than 25 degrees Celsius, ozone can be generated more efficiently. Consequently, as a means to maintain a temperature of a refrigerant to be lower than normal temperature, a low temperature circulating device (hereinafter, will be referred as a chiller) is utilized. However, in a case where a chiller is used, electric power is also consumed for operating a chiller, therefore, there is a problem such that consumption electric power for whole of ozone generating system is increased.

As countermeasures for the above mentioned problems, a method for decreasing a temperature of a discharge space by utilizing cold heat of a liquefied raw material including liquid oxygen, liquid nitrogen, liquid carbon dioxide and liquid air as a raw material for an ozone generating device is disclosed. A method, in which a liquefied raw material which is liquid having an extremely low temperature is utilized as a refrigerant, cooling cost for cooling a refrigerant is not required, consequently, a discharge space can be efficiently cooled, is proposed. For example, a method in which a liquefied raw material is sprayed to a fin which is provided on an electrode so as to cool the electrode by using evaporation heat transfer (for example, Patent Document 1), a method in which after an ozone generating unit is cooled by introducing a liquid raw material to a body of an ozone generating device, the liquid raw material is utilized as a material gas (for example, Patent Document 2), and a method for decreasing a temperature in a discharge space by introducing a material gas, which has a low temperature and is immediately after evaporation, to an ozone generating unit (for example, Patent Document 3), etc. are proposed.

PRIOR ART REFERENCE

Patent Document

Patent Document 1 Japanese Patent Application JP1988-85003A
Patent Document 2=Japanese Patent Application JP1998-338507A
Patent Document 3=Japanese Patent Application JP2013-184861A (paragraph 0026 to 0030, FIG. 6)
Patent Document 4 Japanese Patent JP3545257B2 (paragraph 0007 to 0010)

DISCLOSURE OF THE INVENTION

Problems to be Solved by the Invention

As above mentioned, cooling a discharge space by using cold heat of a liquefied raw material is an effective means to enhance ozone concentration and higher efficiency of an ozone generating device, however, cold heat of a liquefied raw material is limited, and inventors of the present invention find out such that only by using the cold heat, it is difficult to cool whole of a discharge space.

The present invention is made so as to solve the above mentioned problems, and the present invention aims to efficiently improve ozone generating performance.

Means for Solving the Problems

In an ozone generating device of the present invention comprising a discharge unit configured to discharge a material gas which flows through a discharge space which is formed between two electrodes to generate ozone and a cooling unit configured to radiate heat which is generated by discharging, at least a portion of the material gas is obtained by vaporizing a liquefied raw material, the cooling unit comprises a first cooling unit through which a first refrigerant flows in contact with at least one of the two electrodes and a second cooling unit which is provided further to the downstream side of flow of the material gas in the discharge unit than the first cooling unit, through which a second refrigerant flows in contact with at least one of the two electrodes, and in which the cold heat source is the liquefied raw material, and the temperature of the second refrigerant which is introduced to the second cooling unit is set to be lower than the temperature of the first refrigerant which is introduced to the first cooling unit.

Advantage of the Invention

According to the present invention, among discharge spaces, cold heat is acted preferentially to a part whose ozone concentration is high so as to maintain a temperature of the part having high ozone concentration to be lower than that of other part, as a result, ozone generating performance can be improved efficiently by using limited amount of cold heat.

MODE FOR CARRYING OUT THE INVENTION

In order to describe such that it is difficult to cool a discharge space only by cold heat of a liquefied raw material, a case in which a liquefied raw material is liquid oxygen will be taken as an example. When 1 g of liquid oxygen is transformed to an oxygen gas whose normal temperature is 298K, whose general pressure is 100 kPa, cold heat which is acted is total of evaporation cold heat in evaporation (approximately 200 J), cold heat in gas expansion (approximately 100 J) and sensible heat (approximately 100 J), that is, approximately 400 J per 1 g. In an ozone generating device, an amount of a material gas which is required for one electrode is typically, 0.07 g/s, at maximum, approximately 0.25 g/s, and an amount of heat corresponding to the amount of a material gas is 28 W or 100 W, respectively. On the other hand, discharge electric power in an ozone generating device per one electrode is 200 to 300 W, and 90% of the electric power becomes to thermal energy, therefore, hot heat which is generated by discharging is 180 to 270 W. Here, a temperature of a discharge space Tg depends only on discharge electric power Wd, discharge gap length d and a temperature of an electrode Te as shown in an equation 1 (Patent Document 4).

$$Tg = c \times Wd \times d + Te \qquad \text{(Equation 1)}$$

Here, c is a constant which depends on an electrode shape, a coefficient of thermal conductivity of a material gas and the configuration of a cooling unit, etc. . . . .

A discharge gap length in an ozone generating device is determined at the step of manufacturing the device, therefore, generally a temperature of a discharge space during operation of an ozone generating device is determined only by discharging electric power. In order to maintain a temperature of a discharge space to be constant, it is necessary to maintain a temperature of an electrode to be constant by compensating hot heat which is generated by discharging by using cold heat which is input to the electrode. However, cold heat of liquid oxygen (at maximum, 100 W) is smaller than hot heat (at minimum, 180 W) which is generated by discharging, therefore, it is found out such that it is difficult to maintain a temperature of whole of a discharge space to be low only by cold heat of liquid oxygen. Consequently, by cooling with a liquefied raw material, improvement of ozone concentration and ozone generating efficiency (hereinafter, will be referred as ozone generating performance) cannot be achieved. Then, inventors of the present invention considered as follows.

Figure 2:
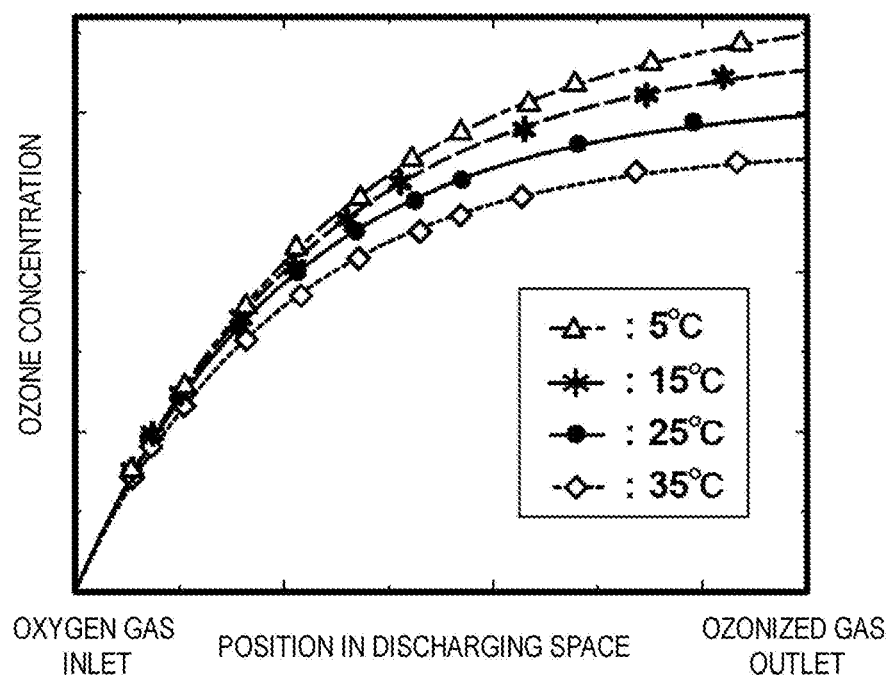
FIG. 2 is a diagram showing an ozone generation characteristic in order to describe an effect of the present invention.

FIG. 2 is a diagram showing examples of ozone generation characteristic in a case where a temperature of a refrigerant is 5, 15, 25 and 35 degrees Celsius in a silent discharge type ozone generating device in which a ground electrode is cooled by a refrigerant. In FIG. 2, conditions other than a temperature of a refrigerant including a gap length between a high voltage electrode and a ground electrode (discharge gap length), electric power, a composition of a material gas, gas pressure, etc. are same. A horizontal axis is a position in a discharge space, a left end is an entrance of a material gas and a right end is an exit of a gas containing ozone. A vertical axis shows an ozone concentration. As shown in FIG. 2, it can be found out such that when a temperature of a refrigerant is lower, an ozone concentration is higher. Further, among discharge spaces, in a region which is close to an exit of an ozonized gas and whose ozone concentration is high (hereinafter, will be referred as a high ozone concentration region), in comparison with an entrance of a material gas, an influence of a temperature of a refrigerant which is given to an ozone concentration is large. Cold heat of a liquefied raw material is limited, and cold heat of a liquefied raw material does not have capacity for maintaining a temperature of whole of a discharge space, however, inventors of the present invention found out such that even when a range in which cold heat of a liquefied raw material is acted is limited to be a high ozone concentration region, a temperature of a high ozone concentration region can be maintained to be low, therefore ozone generating performance can be improved. Hereinafter, by referring to Figures, the present invention will be concretely described.

Figure 1:
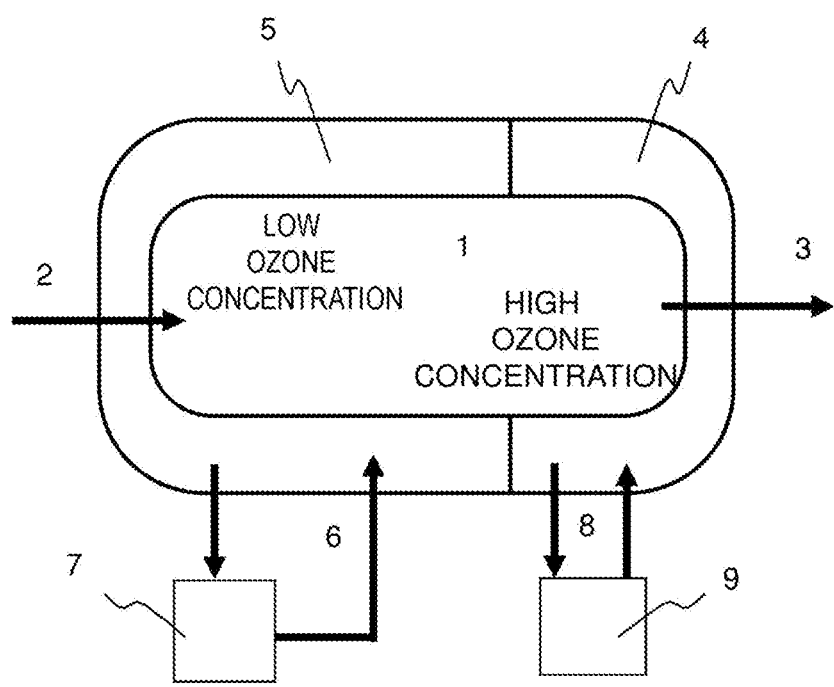
FIG. 1 is a conceptual diagram showing a configuration of an ozone generating device according to the present invention.

FIG. 1 is a conceptual diagram showing the configuration of an ozone generating device according to the present invention. FIG. 1 shows conceptually an ozone generating device in which a material gas 2 which contains oxygen flows in a discharge space which is formed between two electrodes which are provided facing each other in a discharge unit 1, an AC voltage is applied between the two electrodes so as to discharge the material gas and an ozonized gas 3 is obtained. A refrigerant which flows in a cooling unit contacts at least one of the two electrodes in the discharge unit 1 so as to cool the electrode. A cooling unit is completely or partially divided into a first cooling unit 5 in which a first refrigerant 6 flows and a second cooling unit 4 in which a second refrigerant 8 flows. The second cooling unit 4 is provided further to the downstream side of the material gas 2 than the first cooling unit 5. By a first cold heat source 7, a temperature of the first refrigerant 6 which flows to the first cooling unit 5 is set to be constant, and by a second cold heat source 9, a temperature of the second refrigerant 8 which flows to the second cooling unit 4 is set to be lower than a temperature of the first refrigerant 6. The second cold heat source 9 is a liquefied raw material, after cold heat of the liquefied raw material is used for cooling the second cooling unit 4, the liquefied raw material is used as the material gas 2. It is configured such that among discharge spaces, at a side which is further to the downstream of the material gas, an ozone concentration is higher, and the second refrigerant 8 cools a high ozone concentration region, therefore, a temperature of a high ozone concentration region can be maintained to be lower. As a result, ozone generating performance can be improved. As the configuration in which cold heat source of the second refrigerant 8 is a liquefied raw material, a temperature of the second refrigerant 8 which flows to the second cooling unit 4 is set to be lower than a temperature of the first refrigerant 6 which flows to the first cooling unit 5, various configurations can be considered. Hereinafter, as embodiments of the present invention, various configurations will be described.

Embodiment 1

Figure 3:
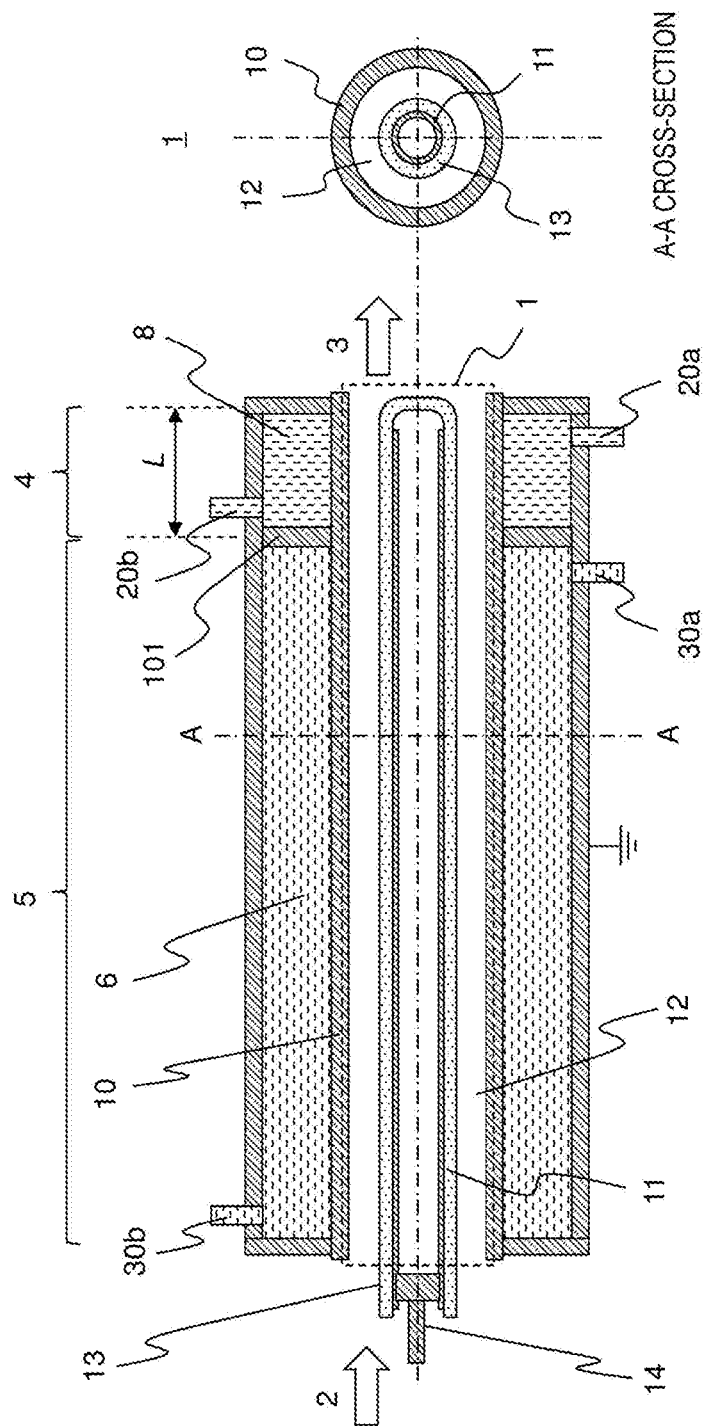
FIG. 3 is a diagram showing a section of an ozone generating device and a system block according to Embodiment 1 of the present invention.

FIG. 3 is a sectional view showing a discharge unit and a cooling unit of an ozone generating device according to Embodiment 1 of the present invention. Further, for simplification, in FIG. 3, a case of one electrode is shown, however, even in a case of plural electrodes, the structure of an electrode and the configuration in which an electrode and a refrigerant are contacted is same. Actually, in a discharge unit 1 of an ozone generating device, a plurality of electrodes having the structure shown in FIG. 3 are provided in parallel. In later embodiments, a case of one electrode will be described as an example, however, it is needless to say such that the present invention can be applied to a case in which a plurality of electrodes are provided in parallel. Further, in later figures, to a part which is same as or corresponding to the constituents of equipment of an ozone generating device according to Embodiment 1, a same reference character will be given, and unless it is especially needed, description will be omitted.

In the discharge unit 1 in an ozone generating device shown in FIG. 3, a cylindrical metallic ground electrode 10 and a metallic high voltage electrode 11 are arranged on the concentric coaxial so as for both of the electrodes to face each other, a material gas 2 is introduced to a discharge space 12 which is formed between both of the electrodes which face each other, by applying an AC high voltage to the discharge space 12, silent discharge is generated so as to generate ozone. A figure shown in left side of FIG. 3 shows a section which is parallel to a flow of the material gas 2, and a sectional view taken on line A-A of a figure shown in right side of FIG. 3 shows a section of the discharge unit 1 which is perpendicular to a flow of the material gas 2. As shown with a white arrow in FIG. 3, the material gas 2 is introduced from the left side of the paper to a discharge space, and an ozonized gas 3 is taken out from the right side of the paper.

The material gas 2 is gas which contains oxygen, generally, liquid oxygen or liquid air is used. It is known such that when ozone is generated by using pure oxygen gas, while operation for a long period, ozone concentration will be gradually decreased. Therefore, in a case where an oxygen gas is used as a material gas, in order to avoid the above mentioned, a very small amount of nitrogen or dioxide gas is added as a background gas. Consequently, general material gas includes oxygen, air, nitrogen, carbon dioxide, and mixture gas thereof. In the present invention, as a material gas source, a liquefied raw material including liquid oxygen, liquid air, liquid nitrogen and liquid carbon dioxide gas is used. As a liquefied raw material, in some cases, mixed liquefied raw material in which a small amount of liquid nitrogen or liquid carbon dioxide is added to liquid oxygen is used.

In a silent discharge type ozone generating device, at least on one of a side of the ground electrode 10 facing the discharge space 12 and a side of the high voltage electrode 11 facing the discharge space 12, a dielectric is provided. In FIG. 3, as an example, a dielectric 13 is provided on the high voltage electrode 11. The dielectric 13 is made of a bulk material such as glass, ceramics, etc., and in a case where the dielectric 13 is provided on the high voltage electrode 11, an edge of a side of an exit of the ozonized gas 3 (in FIG. 3, left side of the paper) is closed. An electric current from a power source is supplied to the high voltage electrode 11 through a power supply member 14.

The outside of the ground electrode 10 is covered with a cooling unit, and a refrigerant which flows in the cooling unit contacts with the ground electrode 10 so as to cool the ground electrode 10. The cooling unit is divided into a first cooling unit 5 in which a first refrigerant 6 flows and a second cooling unit 4 which is provided further to the downstream side of the flow of the material gas 2 than the first cooling unit 5 and in which a second refrigerant 8 flows with a division wall 101. The second refrigerant 8 is composed of a liquid refrigerant such as water, ethanol, methanol, ethylene glycol or antifreeze, or liquefied raw material such as liquid oxygen, liquid nitrogen, liquid air, liquid carbon dioxide or liquefied natural gas. The first refrigerant 6 is composed of a liquid refrigerant such as water, ethanol, methanol, ethylene glycol or antifreeze. The first refrigerant 6 and the second refrigerant 8 are set to be different temperatures by using separate cold heat sources. A temperature of the first refrigerant 6 which flows to the first cooling unit 5 is set to be a temperature such as a room temperature, which can dissipate at least heat of a discharge unit, and a temperature of the second refrigerant 8 which flows to the second cooling unit 4 is set to be a temperature which is lower than a temperature of the first refrigerant 6 which flows to the first cooling unit 5. A second cold heat source 9 (refer to FIG. 1) which is a cold heat source of the second refrigerant 8 is a liquefied raw material, and a first cold heat source 7 which is a cold heat source of the first refrigerant is a cold heat source of general low temperature refrigerant such as a low temperature refrigerant circulating device, a freezer or a cooling tower. The second refrigerant 8 flows through connecting ports 20a and 20b and flows in the second cooling unit 4 so as to cool a high ozone concentration region which is the downstream side of a flow of a material gas. The first refrigerant 6 flows through connecting ports 30a and 30b and flows in the first cooling unit 5 so as to cool a low ozone concentration region which is the upper stream side of a flow of the material gas. Regarding an example of temperature of each refrigerant, when a temperature of the first refrigerant 6 which flows to the first cooling unit 5 is set to be 25 degrees Celsius, a temperature of the second refrigerant 8 which flows to the second cooling unit 4 is set to be 5 degrees Celsius or lower.

Regarding a flow of each refrigerant to each cooling unit, each refrigerant may flow in from the direction of a high ozone concentration region (right direction in FIG. 3: hereinafter, will be referred as a high ozone concentration side (downstream side of a flow of a material gas)) and flow to the direction of a low ozone concentration region (left direction in FIG. 3: hereinafter, will be referred as a low ozone concentration side (upper stream side of a flow of a material gas) or each refrigerant may flow in from a low ozone concentration side and flow to a high ozone concentration side, however, it is preferable such that each refrigerant flows in from a high ozone concentration side and flows to a low ozone concentration side. This is because such that while a refrigerant flows in a cooling unit, and through heat exchange between the cooling unit and a discharge unit, a temperature of a refrigerant is increased. Therefore, in order to enhance the cooling effect by making a temperature of a high ozone concentration side lower than that of a low ozone concentration side, it is suitable for a refrigerant to flow in from a high ozone concentration side. That is, it is preferable such that the second refrigerant 8 flows through the connecting port 20*a* and flows in a cooling unit, and the second refrigerant 8 flows through the connecting port 20*b* and flows out, and the first refrigerant 6 flows through the connecting port 30*a* and flows in a cooling unit, and the first refrigerant 6 flows through the connecting port 30*b* and flows out.

A length of the second cooling unit 4 L can be freely designed in a range which is larger than zero and smaller than an axial length of an electrode. However, when a length of the second cooling unit 4, L, is decreased, an effect of improving ozone generating performance due to cooling is decreased, and when a length of the second cooling unit 4, L, is increased, an amount of cold heat which is necessary for the second refrigerant 8 is increased, therefore cooling cost is increased. It is preferable to set a length of the second cooling unit 4 so as for an effect of improving ozone generating performance to be maximum with regard to increase of cooling cost by considering the influence which is exerted to ozone generating performance and the influence which is exerted to cooling cost by a length of the second refrigerant 4, L. An optimum value of a length of the second cooling unit 4, L, depends on an operating environment of the discharge unit 1 including the composition of the material gas 2, discharge electric power and a discharge gap length, etc. and an operating environment of the cooling unit including the composition of the second refrigerant 8 and flow rate, etc. . . . . Generally, when a length of the second cooling unit 4, L, is smaller than ⅓ of a length of an electrode Le, it is easy to maintain the difference of a temperature between the first cooling unit 5 by using a small amount of cold heat.

Figure 4:
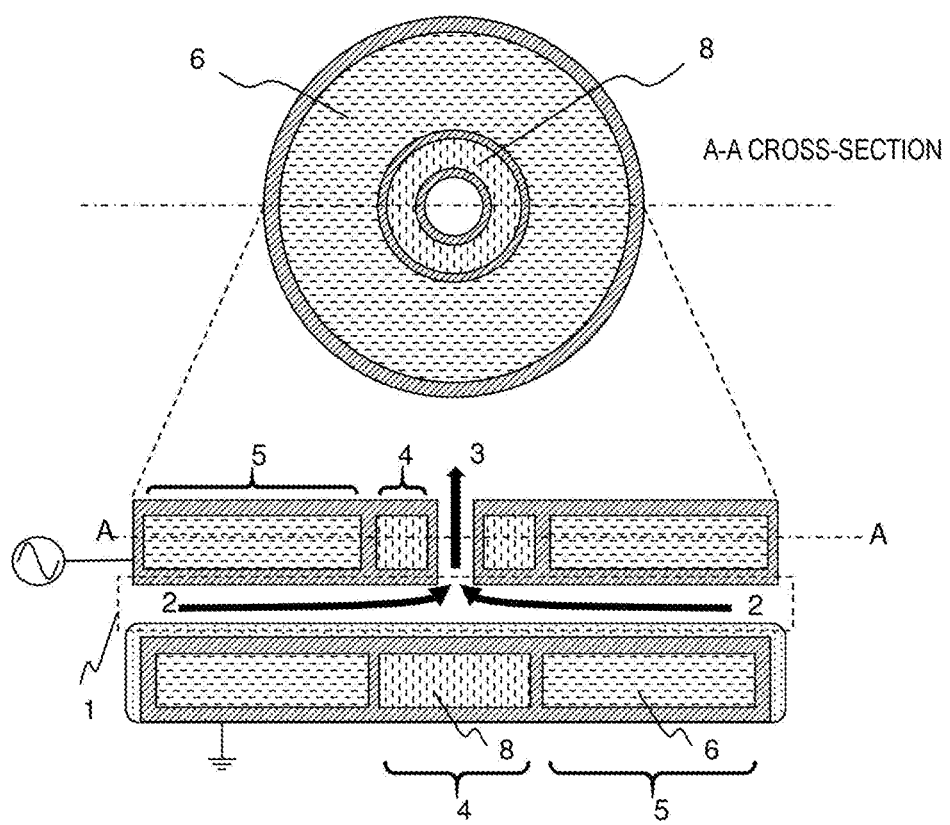
FIG. 4 is a diagram showing a section of another ozone generating device and a system block according to Embodiment 1 of the present invention.

Further, regarding a shape of an electrode of the discharge unit 1 of silent discharge type ozone generating device, various shapes such as a parallel plate type, coaxial cylinder type, etc. are acceptable. In the present invention, any type of electrode shape can be applied. Regarding the configuration of the discharge unit 1, any configuration in which an alternating voltage is applied between two electrodes so as to discharge a material gas which includes oxygen which flows between the two electrodes is acceptable. Regarding the configuration of the first cooling unit 5 and the second cooling unit 4, any configuration in which by contacting a refrigerant to at least one of the two electrodes so as to dissipate heat which is generated by discharging is acceptable. In each embodiment, a coaxial cylinder type electrode which is same as that shown in FIG. 3 will be described as an example, however, it is needless to say such that for example, as shown in a side cross-sectional view shown in FIG. 4 (lower part) and A-A cross-sectional view, the discharge unit 1 may have the configuration in which by applying an AC voltage between two electrodes which have a parallel plate shape and face each other so as to discharge the material gas 2 which flows between the two electrodes which have a parallel plate shape, and the first cooling unit 5 and the second cooling unit 4 may have the configuration in which by contacting a refrigerant to both of the two electrodes which have a parallel plate shape so as to dissipate heat which is generated by discharging.

As described in the above, since in a higher ozone concentration region, an effect of improving ozone generating performance due to cooling by the discharge unit 1 is larger, therefore, according to the configuration of an ozone generating device according to Embodiment 1 of the present invention, great effect of improving ozone generating performance which is made by cold heat of a liquefied raw material is exhibited. Accordingly, it will be unnecessary to separately charge energy so as for the second refrigerant 8 to cool a high ozone concentration region, therefore, cooling cost can be decreased.

Embodiment 2

Figure 5:
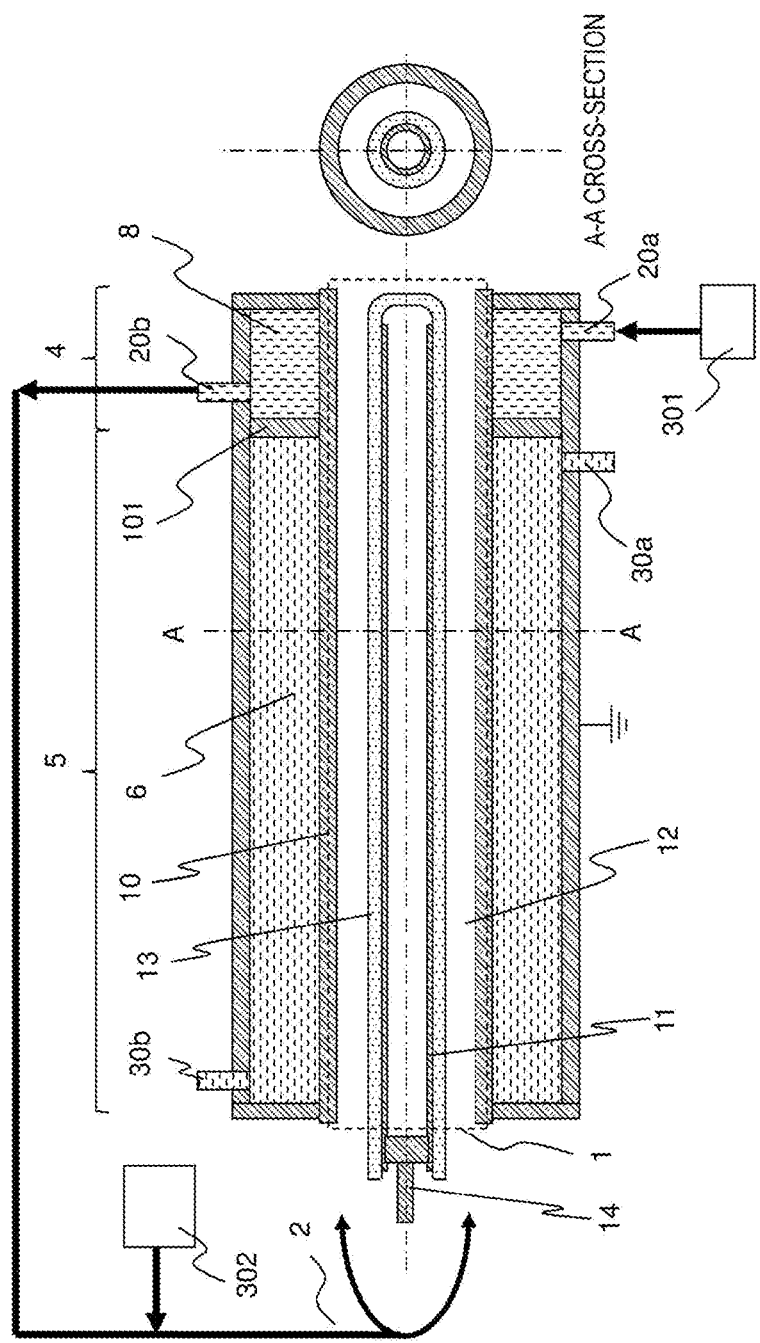
FIG. 5 is a diagram showing a section of a principal part of an ozone generating device and a system block according to Embodiment 2 of the present invention.

FIG. 5 is a diagram showing a section of a principal part of the configuration of an ozone generating device and a system block according to Embodiment 2 of the present invention. Embodiment 2 is an embodiment describing more concretely the configuration of cold heat of a second refrigerant 8 in Embodiment 1. That is, basic configuration of an ozone generating device according to Embodiment 2 is same as that according to Embodiment 1. In Embodiment 2, as the second refrigerant 8, a liquefied raw material such as liquid oxygen, liquid nitrogen, liquid air, liquid carbon dioxide, etc. is used, and it is configured such that the second refrigerant 8 is also supplied as material gas 2. From a liquefied raw material storage tank 301, a liquefied raw material is flown as the second refrigerant 8 through either a connecting port 20*a* or a connecting port 20*b* to a second cooling unit 4 so as to cool a high ozone concentration region, and after that, the liquefied raw material is flown out from another connecting port. In FIG. 5, the second refrigerant 8 flows through the connecting port 20*a* and flows out through the connecting port 20*b*, however, it is acceptable such that a flowing-in part and a flowing-out part is reverse.

When the liquefied raw material as the second refrigerant 8 flows in the second cooling unit 4, the state is liquid and a temperature is extremely low. On the other hand, a first refrigerant 6 which flows to a first cooling unit 5 is set to be a room temperature or higher than zero degrees Celsius. That is, a temperature of the second refrigerant 8 which flows to the second cooling unit 4 is set to be lower than that of the first refrigerant 6 which flows to the first cooling unit 5. A liquefied raw material as the second refrigerant 8 becomes gas at a point when the liquefied raw material flows out from the second cooling unit 4 through heat exchange between a high ozone concentration region. The liquefied raw material which is vaporized is introduced to a discharge space 12 as a material gas 2 and is ozonized by discharging. Before the liquefied raw material which is vaporized is introduced to the discharge space 12, the liquefied raw material may be mixed with other material gas 302 such as nitrogen, and then may be introduced to a discharge space. When a rated flow rate when a liquefied raw material is introduced to a discharge unit is designated as F[L/s], and cold heat of liquefied raw material per unit volume is designated as Q[J/L], an optimal value Lo[m] of a length L of the second cooling unit 4 is obtained by $$Lo = Le \times Q \times F/(0.9 \times Wd)[m] \qquad \text{(equation 2)}$$

using an axial length of an electrode Le[m] and discharge power which is put to a discharge unit at rated operation Wd[W]. By setting a length L of the second cooling unit 4 to be an optimal value Lo, cold heat of the second refrigerant 8 can be completely utilized.

Figure 6:
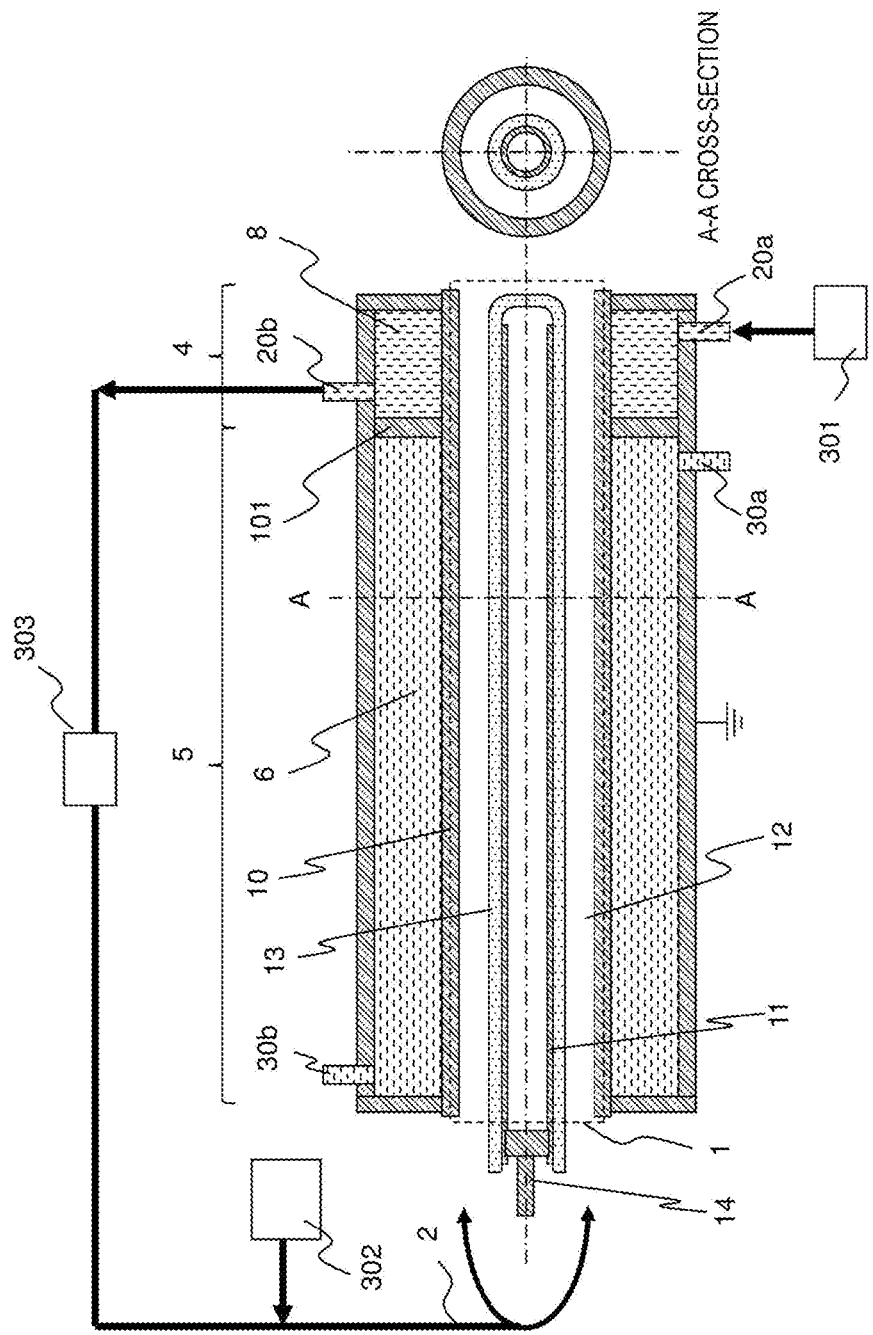
FIG. 6 is a diagram showing a section of another ozone generating device and a system block according to Embodiment 2 of the present invention.

FIG. 6 is a diagram showing a section of a principal part of another configuration of an ozone generating device and a system block according to Embodiment 2 of the present invention. As shown in FIG. 6, after the second refrigerant 8 is flown out from the second cooling unit 4, the second refrigerant 8 may be introduced to the discharge space 12 through a flow rate controlling equipment 303. The flow rate controlling equipment 303 is a valve, a flowmeter with a valve, an adjusting equipment for mass flow rate or a pressure adjusting equipment, etc., and controls a flow rate of the second refrigerant 8 which flows out from the second cooling unit 4. According to set flow rate of the second refrigerant 8 which passes through the flow rate controlling equipment 303, an amount of heat which is exchanged between a discharge unit 1 and the second refrigerant 8 is changed, therefore, as a result, among cold heat of the second refrigerant 8, the ratio (hereinafter, will be referred as cold heat distribution ratio of the second refrigerant 8) of the ratio which is utilized for cooling a high ozone concentration region and the ratio which remains as a temperature of the material gas can be controlled. In later embodiments, unless otherwise specified, the cold heat distribution ratio of the second refrigerant 8 may be controlled by using the flow rate controlling equipment 303, further, before a material gas is introduced to the discharge space 12, the material gas may be mixed with other material gas 302 such as nitrogen and carbon dioxide, and introduced to the discharge space. In this case, a material gas other than the material gas 302, that is, at least one portion of a material gas is gas which is made by vaporizing a liquefied raw material and the liquefied raw material is used as a cold heat source of the second cooling unit 4. Further, a material gas to be mixed such as nitrogen and carbon dioxide is made to be a liquefied raw material, and the liquefied raw material may be used as a cold heat source of the second cooling unit 4.

Figure 7:
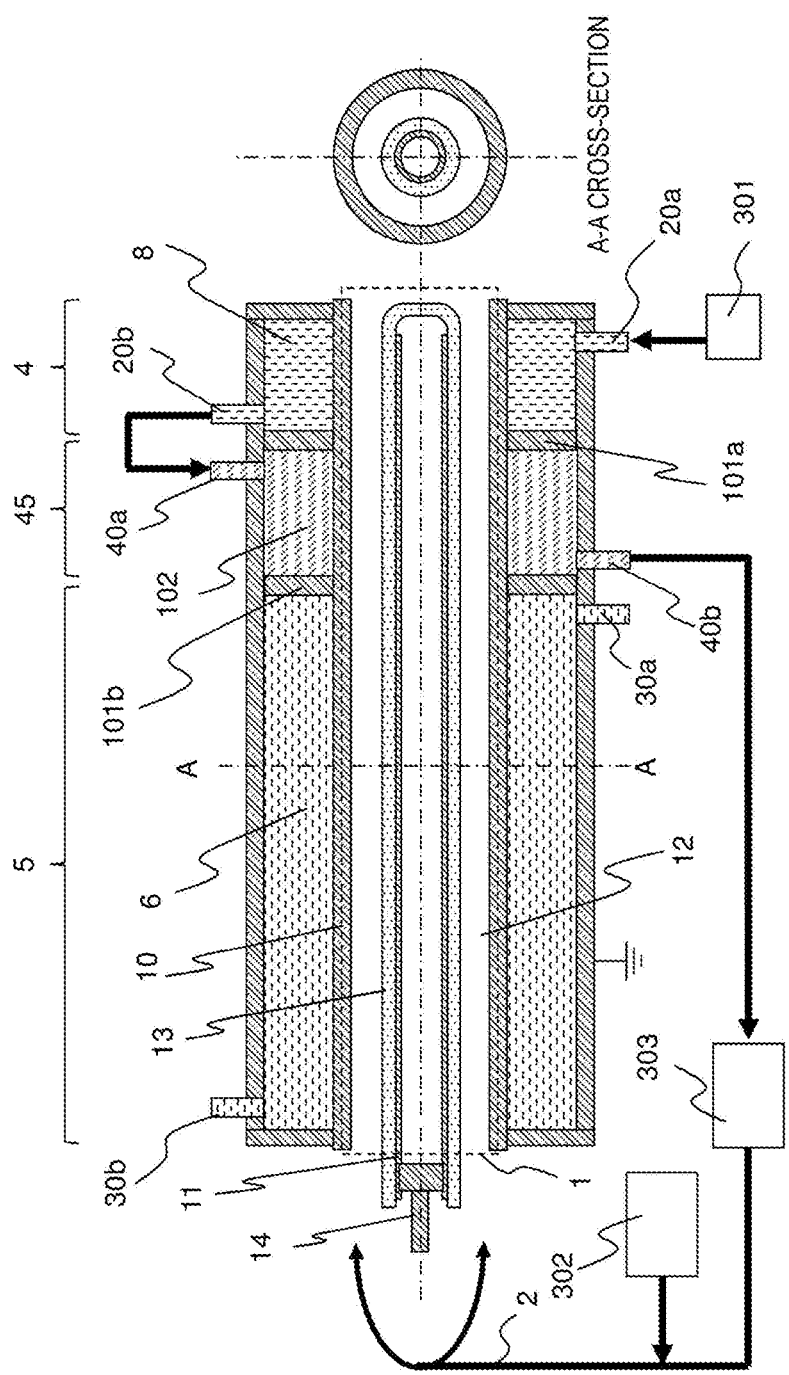
FIG. 7 is a diagram showing a section of other ozone generating device and a system block according to Embodiment 2 of the present invention.

FIG. 7 is a diagram showing a section of a principal part of another configuration of an ozone generating device and a system block according to Embodiment 2 of the present invention. As shown in FIG. 7, an intermediate cooling unit 45 may be provided by using division walls 101a and 101b. A liquefied raw material as the second refrigerant 8 which is introduced to the second cooling unit 4 is vaporized in the second cooling unit 4 so as to cool a ground electrode 10 with vaporization cold heat. A liquefied raw material having a low temperature which is evaporated to be gas state 102 is introduced to the intermediate cooling unit 45 so as to cool the ground electrode 10 with the cold heat. In FIG. 7, each refrigerant flows through a connecting port at a side of a high ozone concentration and flows in a cooling unit, respectively, and flows through a connecting port at a side of a low ozone concentration and flows out, however, naturally, the direction of flow-in and flow-out may be reverse. Cold heat of liquefied raw material is roughly classified into three types, vaporization cold heat, cold heat when gas is expanded and sensible heat, and generally, among the three types of cold heat, volume of vaporization cold heat is the largest. An objective of the configuration of FIG. 7 is acting vaporization cold heat which is the largest among cold heat of liquefied raw material in the second cooling unit 4 which is the closest to a side of a high ozone concentration and acting other cold heat in the intermediate cooling unit 45 which is the next closest to a side of a high ozone concentration.

According to the above-mentioned configuration of an ozone generating device in Embodiment 2, among discharge spaces, a high ozone concentration region can be effectively cooled and large effect of improving ozone generating performance can be exhibited with a small amount of cold heat. Further, in a case where a liquefied raw material is utilized as the material gas 2 of an ozone generating device, the liquefied raw material itself functions as a cold heat source of the second refrigerant 8, therefore, cooling cost for maintaining a temperature of the second refrigerant 8 lower than that of the first refrigerant 6 will be not required. Further, by controlling a cold heat distribution ratio of the second refrigerant 8 by using the flow rate controlling equipment 303, a cooling system which is optimal to improvement of ozone generating performance can be realized. Further by providing the intermediate cooling unit 45, cold heat of a liquefied raw material can be completely utilized for cooling the discharge space 12.

Embodiment 3

Figure 8:
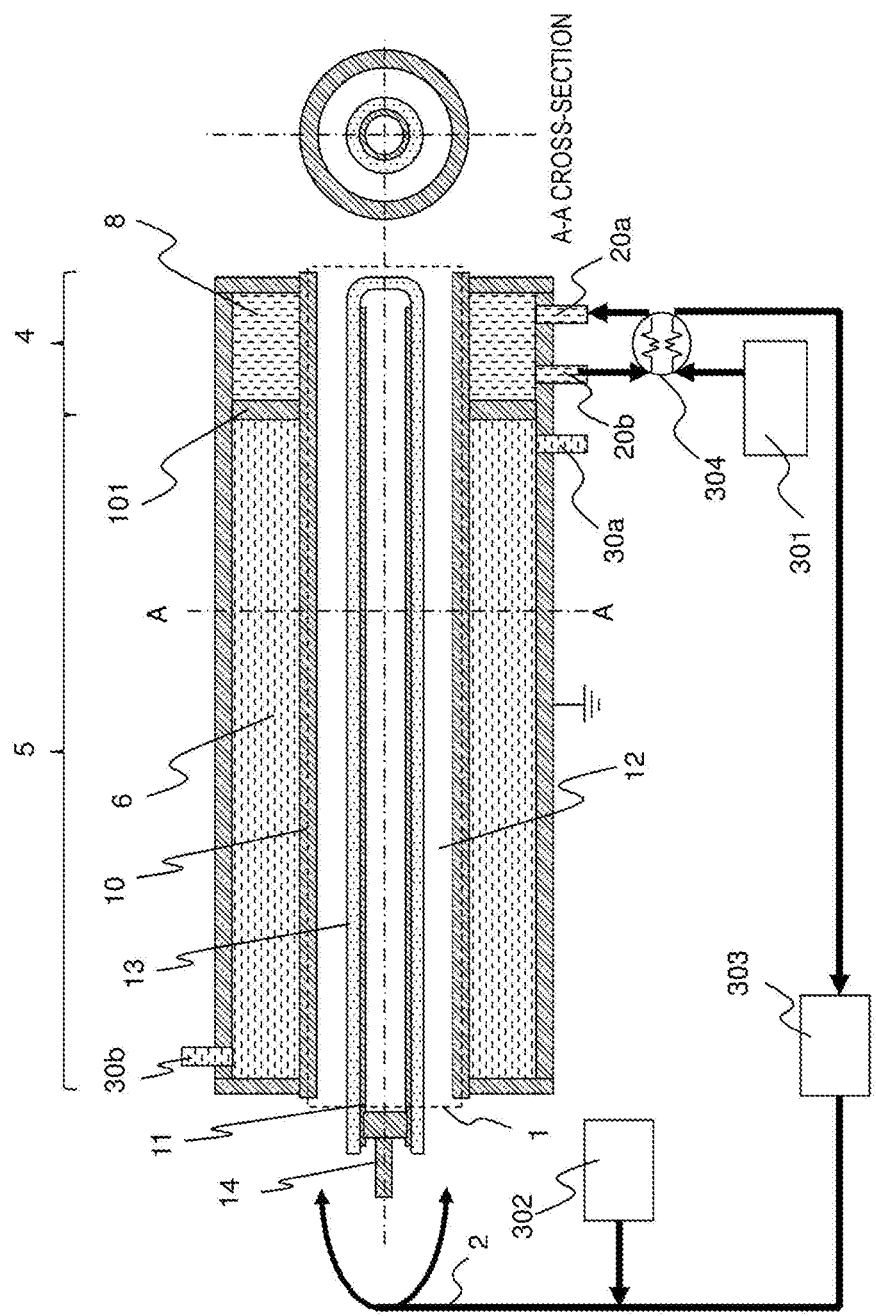
FIG. 8 is a diagram showing a section of an ozone generating device and a system block according to Embodiment 3 of the present invention.

FIG. 8 is a diagram showing a section of a principal part of the configuration of an ozone generating device and a system block according to Embodiment 3 of the present invention. Unlike an ozone generating device according to Embodiment 2, in an ozone generating device according to Embodiment 3, a liquefied raw material is not directly used as a second refrigerant 8 and a heat exchanger, which performs heat exchange between the second refrigerant 8 and a liquefied raw material, is provided. A liquefied raw material passes through a circulating heat exchanger 304 and functions as a cold heat source of the second refrigerant 8 so as to set a temperature of the second refrigerant 8 which flows to a second cooling unit 4 to be a low temperature. In also Embodiment 3, a liquefied raw material which is vaporized by heat exchange is utilized as a starting raw material gas 2. A temperature of the second refrigerant 8 which flows to the second cooling unit 4 is set to be lower than a temperature of a first refrigerant 6 which flows to a first cooling unit 5 by passing through the circulating heat exchanger 304 and cooling with cold heat of the liquefied raw material. In Embodiment 2 in which a liquefied raw material is directly utilized as the second refrigerant 8, pressure of a liquefied raw material which flows in the second cooling unit 4 is high, therefore, it is necessary to make the configuration of the second cooling unit 4 to be high pressure resistance. However, according to the configuration of an ozone generating device in Embodiment 3, a material of the second refrigerant 8 is not limited, therefore it is not necessary to make the configuration of the second cooling unit 4 to be high pressure resistance.

Figure 9:
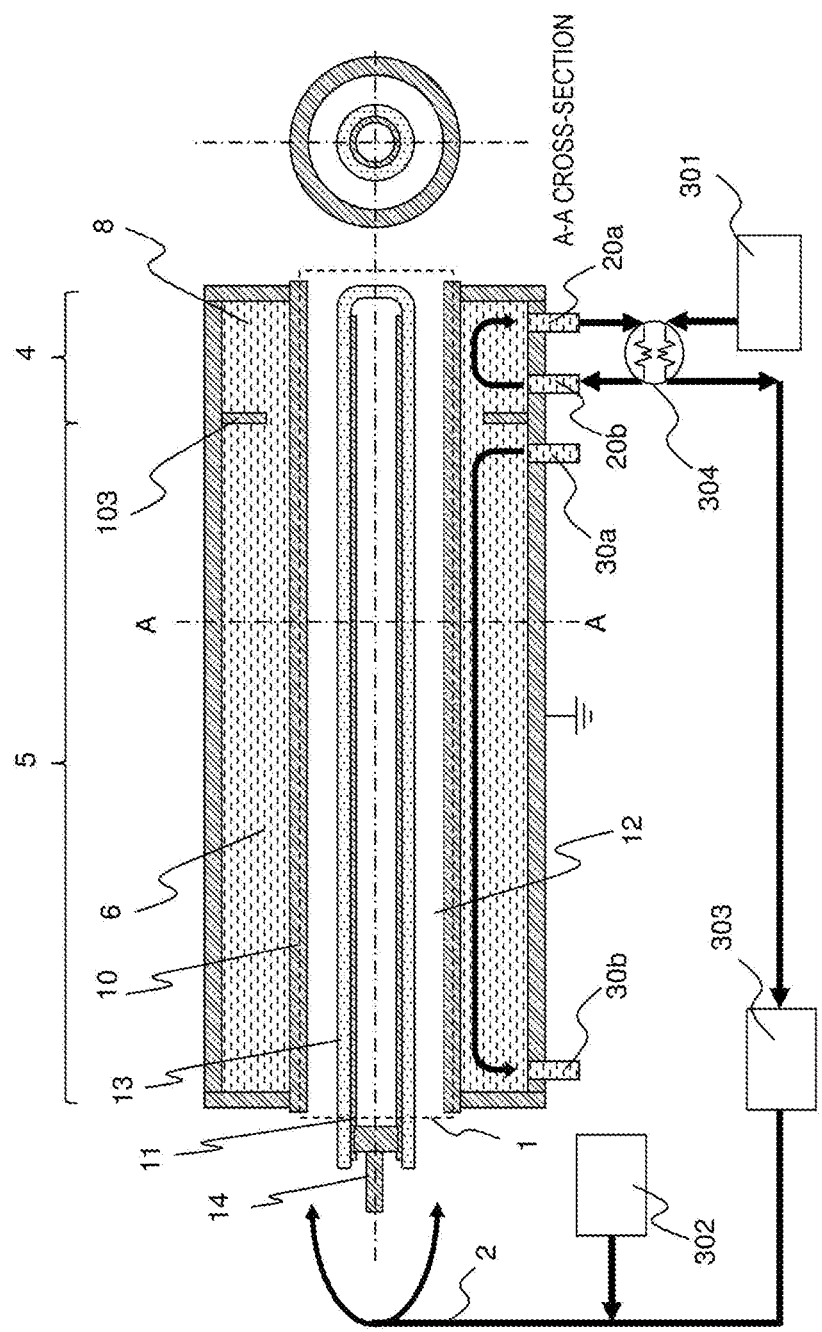
FIG. 9 is a diagram showing a section of another ozone generating device and a system block according to Embodiment 3 of the present invention.

FIG. 9 is a diagram showing a section of a principal part of other configuration of an ozone generating device and a system block according to Embodiment 3 of the present invention. Unlike the configuration of an ozone generating device shown in FIG. 8, according to the configuration of an ozone generating device shown in FIG. 9, the second cooling unit 4 and the first cooling unit 5 are not completely divided with a division wall 103, and the second cooling unit 4 and the first cooling unit 5 are partially connected, and the second refrigerant 8 and the first refrigerant 6 are composed of the same material. That is, the cooling units are configured to allow the first refrigerant 6 in the first cooling unit 5 to flow to the second cooling unit 4 and to allow the second refrigerant 8 in the second cooling unit 4 to flow to the first cooling unit 5. In this case, the configuration of a cooling unit is simpler in comparison with that shown in FIG. 8. As shown in FIG. 9, the division wall 103 may be provided far away from a ground electrode 10, or the division wall 103 may be fixed to the ground electrode 10 so as to be away from a body. As shown in FIG. 9, in a case where the second cooling unit 4 and the first cooling unit 5 are partially connected and the cooling units are configured to allow the first refrigerant 6 to flow to the second cooling unit and to allow the second refrigerant 8 to flow to the first cooling unit, it is preferable such that the second refrigerant 8 flows through a connecting port 20b to the second cooling unit 4 and flows out through a connecting port 20a. In this case, the second refrigerant 8 flows along with an arrow which goes from the connecting port 20b to the connecting port 20a in FIG. 9, and the first refrigerant 6 flows along with an arrow which goes from the connecting port 30a to the connecting port 30b in FIG. 9. According to the above mentioned configuration, mixture of the second refrigerant 8 and the first refrigerant 6 can be suppressed to be the minimum and it is easier to maintain the difference of temperature between that of the second cooling unit 4 and that of the first cooling unit 5.

Figure 10:
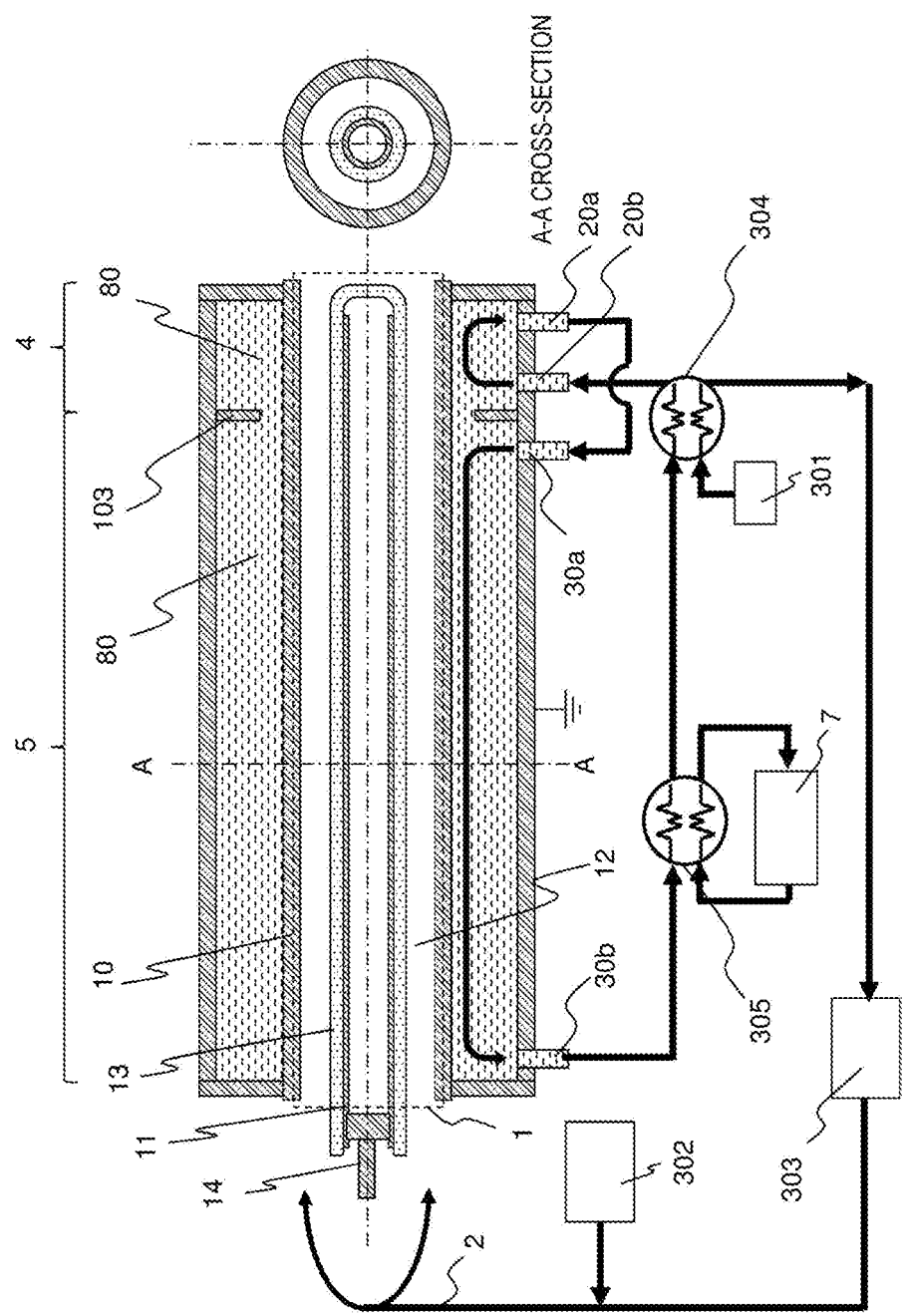
FIG. 10 is a diagram showing a section of other ozone generating device and a system block according to Embodiment 3 of the present invention.

FIG. 10 is a diagram showing a section of a principal part of other configuration of an ozone generating device and a system block according to Embodiment 3 of the present invention. As shown in FIG. 10, a refrigerant which flows in the second cooling unit 4 and a refrigerant which flows in the first cooling unit 5 may be common refrigerant 80 which flows in a circulating system. The common refrigerant 80 cools a high ozone concentration region in the second cooling unit 4 and after that, the common refrigerant 80 is introduced to the first cooling unit 5 so as to cool a low ozone concentration region. The common refrigerant 80 cools a low ozone concentration region and flows out from the first cooling unit 5, and after that, the common refrigerant 80 passes through a heat exchanger 305 so as to be cooled to be a temperature which is same as that of a first cold heat source 7. After that, the common refrigerant 80 passes through the circulating heat exchanger 304 so as to be cooled lower than a temperature of the first cold heat source 7, and then the common refrigerant 80 is introduced to the second cooling unit 4 again. In the configuration shown in FIG. 10, a temperature of the common refrigerant 80 which is introduced to the second cooling unit 4 is set to be lower than a temperature of the common refrigerant 80 which is introduced to the first cooling unit. In the circulating heat exchanger 304, a liquefied raw material functions as a cold heat source so as to cool the common refrigerant 80, and a liquefied raw material which is vaporized is introduced to a discharge space as the material gas 2. In FIGS. 9 and 10, an example in which a liquefied raw material is used as a second cold heat source which performs heat exchange by the circulating heat exchanger 304 is shown, however, it is needless to say such that the configuration in which a liquefied raw material is not used as a second cold heat source and a cold heat source other than a liquefied raw material (for example, low temperature refrigerant circulating device or freezer, etc.) is used is acceptable.

According to the configuration of an ozone generating device in Embodiment 3, by cooling effectively a high ozone concentration region, an improvement of ozone generating performance due to cooling can be achieved. Further, the configuration is such that a liquefied raw material itself is not used as the second refrigerant 8 of the second cooling unit 4, cold heat of a liquefied raw material is given to the second refrigerant 8 through the circulating heat exchanger 304, therefore a refrigerant which is made of general material can be used as the second refrigerant 8. Consequently, the configuration of a cooling unit is simpler and manufacturing cost of a cooling unit can be decreased. Further, when the cooling units are configured so as to allow the first refrigerant 6 to flow to the second cooling unit and to allow the second refrigerant 8 to flow to the first cooling unit as shown in FIGS. 9 and 10, the configuration of the cooling unit can be simplified, and the first refrigerant 6 and the second refrigerant 8 can be made of the same material. Further, when a refrigerant which flows in the first cooling unit 5 and a refrigerant which flows in the second cooling unit 4 are made to be the common refrigerant 80, an amount of refrigerant which is necessary can be decreased.

Embodiment 4

Figure 11:
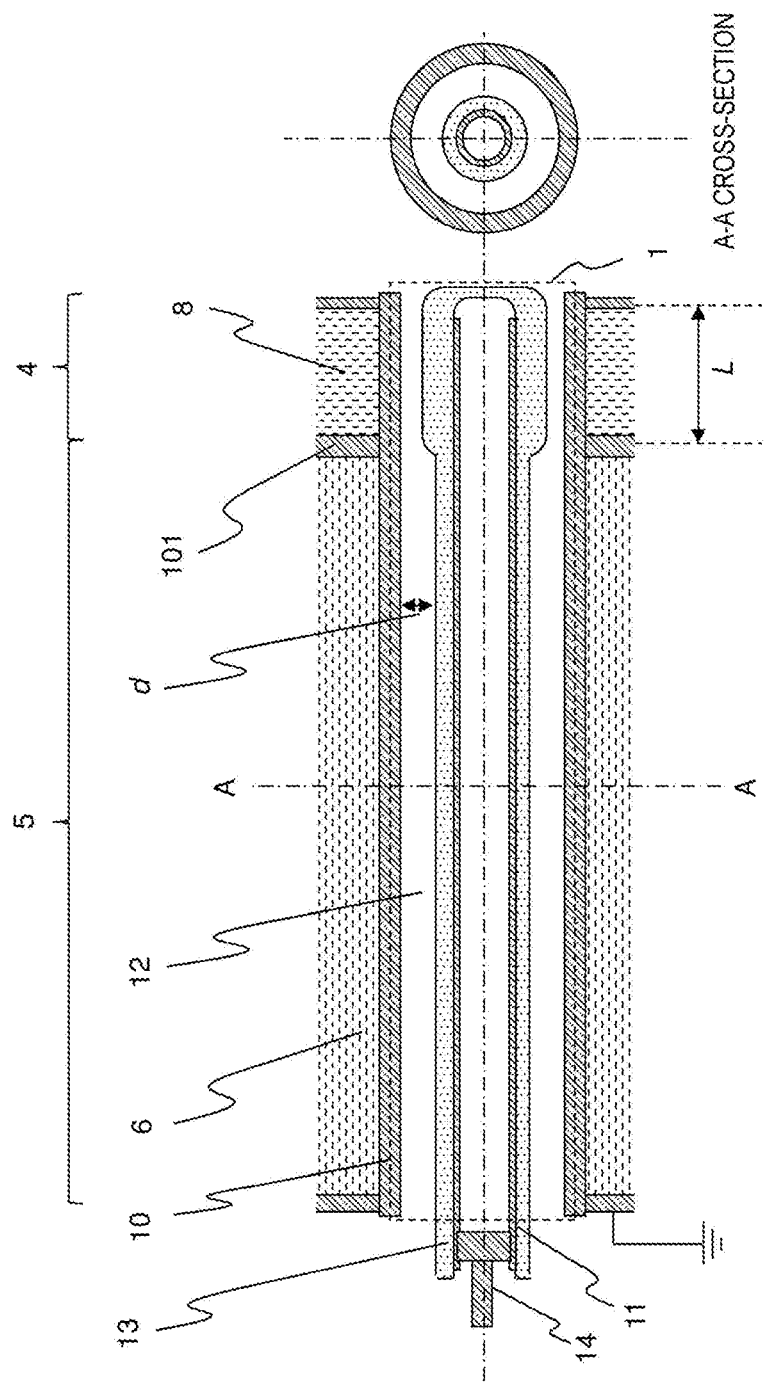
FIG. 11 is a sectional view showing a principal part of an ozone generating device according to Embodiment 4 of the present invention.
Figure 12:
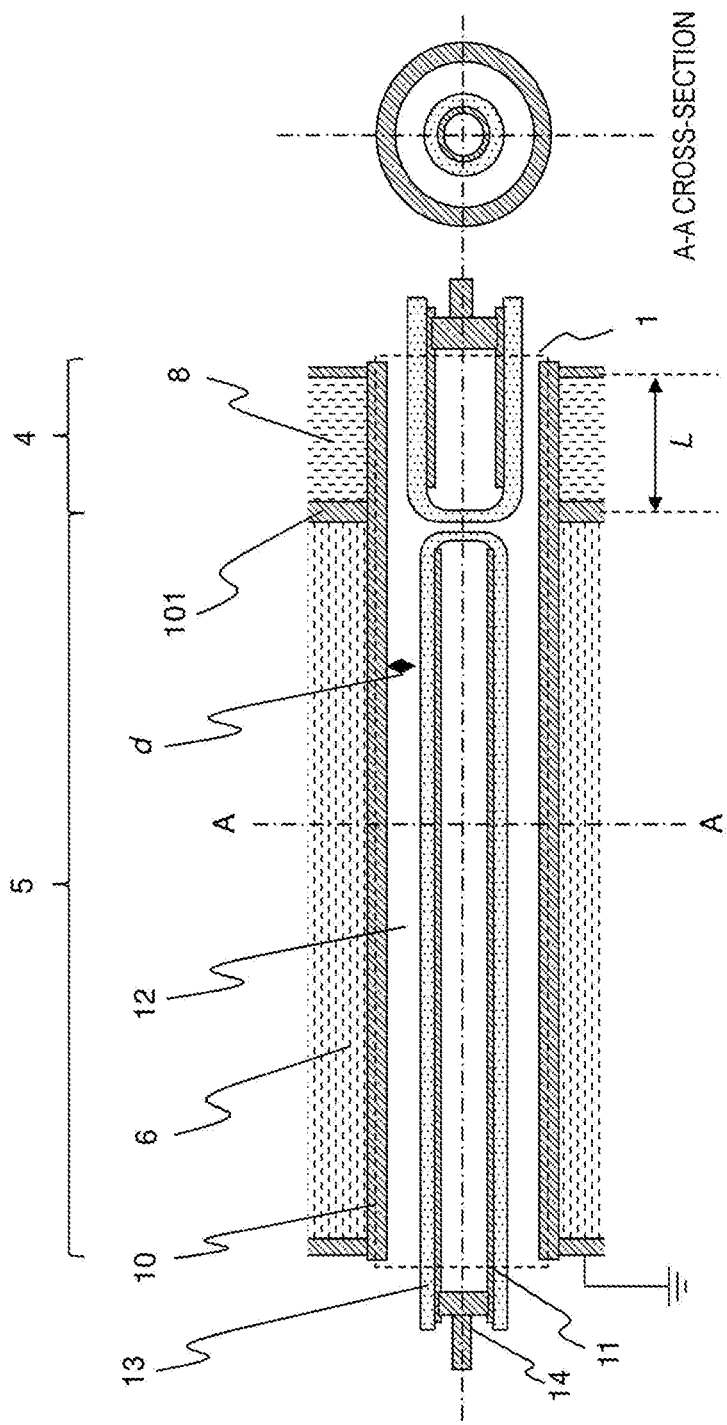
FIG. 12 is a sectional view showing a principal part of another ozone generating device according to Embodiment 4 of the present invention.

FIGS. 11 and 12 are sectional views showing a discharge unit and a cooling unit which are principal parts of an ozone generating device according to Embodiment 4 of the present invention. Connecting ports of a second refrigerant 8 and those of a first refrigerant 6 are same as those in Embodiment 1, therefore, they are omitted. Characteristic points in Embodiment 4 which are different from those of Embodiments 1, 2 and 3 are such that a discharge gap length d which is gap size of a discharge space is not spatially uniform and a length L of a second cooling unit 4 is a length corresponding to a shorter part of discharge gap length d. That is, in an ozone generating device according to Embodiment 4, the second cooling unit 4 is provided in a discharge unit whose discharge gap length is set to be short. It is known such that generally, in a case where gas pressure in a discharge space is 1.0 to 3.0 atm, when a discharge gap length d is shorter, ozone generating performance is greater (for example, Patent Document 4). Consequently, in order to improve ozone generating performance, in some cases, the configuration, in which in a discharge space, at a side of an exit of an ozonized gas where an ozone concentration is high, that is, at a side of downstream of a flow of a material gas, a discharge gap length d is shortened, may be adopted. As a means for changing a discharge gap length d, as shown in FIG. 11, a thickness of a dielectric 13 may be changed in an axial direction or as shown in FIG. 12, electrode tubes whose size of diameter are different may be connected. Further, as shown in FIG. 7, an intermediate cooling unit may be provided and corresponding to the intermediate cooling unit, a discharge gap length may be changed in three steps. It is not needless to say such that as in Embodiments 2 and 3, a liquefied raw material may be used as a cold heat source of a second refrigerant 8, and the second cooling unit 4 and the first cooling unit 5 may be completely divided or partially divided with a division wall 101.

In a case where a discharge gap length d is spatially non-uniform as shown in FIGS. 11 and 12, in a part whose discharge gap length d is shorter, an improvement effect of ozone generating performance due to cooling is higher. That is, according to the configuration of an ozone generating device in Embodiment 4, the second cooling unit 4 is provided in a discharge unit whose discharge gap length d is short, cooling is performed by using the second refrigerant 8 whose temperature is lower, and other part is cooled by a first refrigerant 6, consequently, greater ozone generating performance effect can be obtained by a small amount of cold heat.

Embodiment 5

Figure 13:
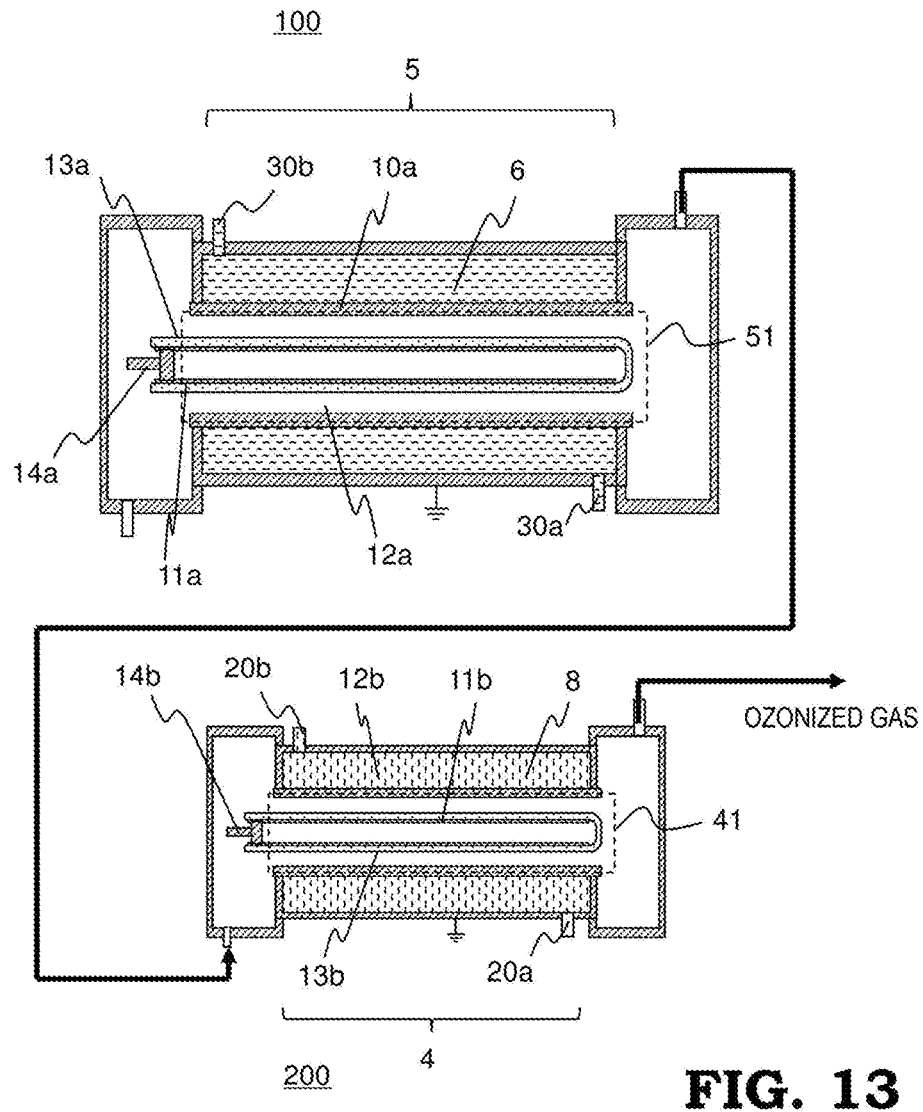
FIG. 13 is a schematic flow diagram showing the configuration of an ozone generating device according to Embodiment 5 of the present invention.

FIG. 13 is a schematic flow diagram showing the configuration of an ozone generating device according to Embodiment 5 of the present invention. In Embodiment 5, two ozone generating devices, a first ozone generating device 100 and a second ozone generating device 200 are provided. Each of the ozone generating devices is composed of a discharge unit and a cooling unit, respectively. That is, discharge units are separated as a discharge unit of different ozone generating devices. It is configured such that an ozonized gas which is generated and flown by the first ozone generating device 100 is introduced to the second ozone generating device 200 so as to further increase an ozone concentration. Further, for simplification, in FIG. 13, a case in which as each ozone generating device, the number of electrode is one is shown, however, even when a plurality of electrodes are provided for one ozone generating device, the configuration is same, and in a discharge unit of an actual ozone generating device, a plurality of electrodes having the configuration shown in FIG. 3 are provided in parallel. A first discharge unit 51 which is a discharge unit of the first ozone generating device 100 is cooled by using a first refrigerant 6 in a first cooling unit 5, and a second discharge unit 41 which is a discharge unit of the second ozone generating device 200 is cooled by using a second refrigerant 8 in a second cooling unit 4. Even in the above mentioned configuration, a temperature of the second refrigerant 8 which flows to the second cooling unit 4 which is provided in the second ozone generating device 200 which is provided at a side of downstream and whose ozone concentration is high is set to be lower than a temperature of the first refrigerant 6 which flows to the first cooling unit 5 which is provided in the first ozone generating device which is provided at a side of upper stream and whose ozone concentration is low. Regarding cooling systems, among cooling systems which are described in Embodiments 1 to 3, cooling systems are composed of applicable cooling systems.

A length $L_2$ of an electrode in an axial direction in the second ozone generating device 200 is shorter than a length $L_1$ of an electrode in the first ozone generating device 100. A ratio $L_2/(L_1+L_2)$ is not limited, however, when $L_2/(L_1+L_2)$ is set to be equal to the ratio $Wc/0.9 \times Wt$ of cold heat We of the second refrigerant with regard to electric power $0.9 \times Wt$ which becomes hot heat among the sum of discharge electric power $W_1$ in the first ozone generating device 100 and discharge electric power $W_2$ in the second ozone generating device 200, $Wt=W_1+W_2$, an improvement effect of ozone generating performance can be increased to the highest level. For example, when discharge electric power $Wt=300$ W, liquid oxygen as the second refrigerant 8 is flown at 0.2 g/s, cold heat of liquid oxygen is approximately 400 J/g, therefore with regard to $L_1=1$ m, it is preferable to set $L_2=0.42$ approximately.

As above mentioned, in an ozone generating device according to Embodiment 5, the first discharge unit 51 which is cooled by the first cooling unit 5 and the second discharge unit 41 which is cooled by the second cooling unit 4 are not integrated but are individual separated discharge units, the first ozone generating device 100 which is composed of the first cooling unit 5 and the first discharge unit 51, and second ozone generating device 200 which is composed of the second cooling unit 4 and the second discharge unit 41 are provided. By applying the present invention, that is, by making the configuration in which an ozonized gas which is generated by the first ozone generating device 100 is introduced to the second ozone generating device 200 so as to be taken out as an ozonized gas having higher ozone concentration and setting a temperature of the second refrigerant 8 which flows to the second cooling unit 4 at a side of high ozone concentration to be lower than a temperature of the first refrigerant 5 which flows to the first cooling unit 5 at a side of low ozone concentration, ozone generating performance can be effectively improved by using limited cold heat.

Embodiment 6

Figure 14:
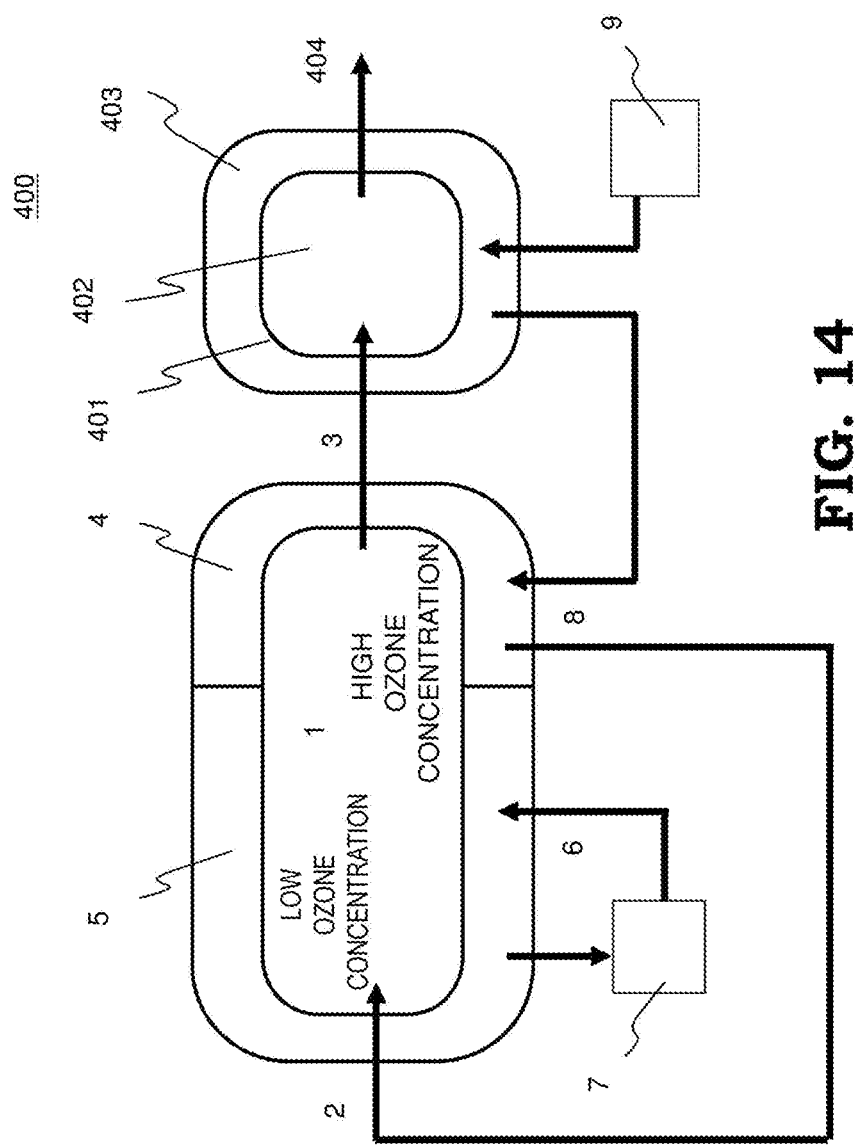
FIG. 14 is a schematic flow diagram showing the configuration of an ozone generating device according to Embodiment 6 of the present invention.

FIG. 14 is an example of a schematic flow diagram showing the configuration of an ozone generating device according to Embodiment 6 of the present invention. An ozone generating device according to Embodiment 6 supplies an ozonized gas 3 to an ozone concentrator 400 and comprises the configuration in which cold heat of liquid raw material is used for cooling the ozone concentrator 400. In Embodiment 6, the ozone concentrator 400 is composed of an ozone adsorption tower 401, an adsorbent 402 and an ozone adsorption tower cooling unit 403. The ozone adsorption tower 401 with which the adsorbent 402 is filled is cooled by a refrigerant which flows in the ozone adsorption tower cooling unit 403, and a temperature of the adsorbent 402 is maintained to be lower than zero degrees Celsius. When the ozonized gas 3 flows in the ozone adsorption tower 401, ozone is adsorbed to the adsorbent 402 which is cooled. When ozone is taken out from the ozone concentrator 400, by decreasing the pressure of the ozone adsorption tower 401, ozone which is adsorbed to the adsorbent 402 is desorbed, therefore the ozone can be taken out as an ozonized gas 404 whose concentration is higher than that of the ozone which is before being adsorbed. In the present invention, cold heat of a liquid raw material is used for cooling the ozone adsorption tower 401. In general, adsorption heat which is generated when ozone is adsorbed is lower than hot heat of discharge which is generated when ozone is generated, and is approximately 140 J per 1 g of ozone. The above mentioned adsorption heat can be sufficiently cooled by a general flow rate of raw material when ozone is generated.

Further, by utilizing a liquid raw material which is used for cooling the ozone adsorption tower 401 as the second refrigerant 8 in an ozone generating device, cold heat of the liquid raw material can be effectively used. Preferably, when a length of the second cooling unit 4 is set so as for the sum of hot heat of discharge which is generated in the second cooling unit 4 and ozone adsorption heat in the ozone adsorption tower 401 to be equal to cold heat of the liquid raw material at rated flow rate, cold heat can be completely used. In FIG. 14, the second refrigerant 8 is introduced to the second cooling unit 4 in an ozone generating device after the second refrigerant 8 flows in the ozone adsorption tower cooling unit 403, however, the second refrigerant 8 may be introduced to the ozone adsorption tower cooling unit 403 after the second refrigerant flows in the second cooling unit 4. In either case, the configuration, in which in the ozone adsorption tower cooling unit 403, not all of a liquid raw material which is used as a material gas 2 for generating ozone after being vaporized is used, and in the ozone adsorption tower cooling unit 403, a portion of a liquid raw material is used, is acceptable.

A case in which the above mentioned high efficient ozone concentrator is applied includes contact treated with ozone for sludge, ozone water wash of sewage treatment films, etc.

Further, within the scope of the present invention, embodiments of the present invention may be appropriately combined, changed, or omitted.

REFERENCE CHARACTERS

1: discharge unit
2: material gas
3, 404: ozonized gas
4: second cooling unit
5: first cooling unit
6: first refrigerant
7: cold heat source of a first refrigerant 6
8: second refrigerant
9: cold heat source of a second refrigerant 8
10 ground electrode
11: high voltage electrode
12: discharge space
13: dielectric
20a, 20b: connecting port for a second refrigerant 8 to a second cooling unit 4
30a, 30b: connecting port for a first refrigerant 6 to a first cooling unit 5
41: second discharge unit
51: first discharge unit
100: first ozone generating device
101, 101a, 101b, 103: division wall
200: second ozone generating device
301: a liquefied raw material storage tank
304: circulating heat exchanger
400: ozone concentrator
401: ozone adsorption tower
402: adsorbent
403: ozone adsorption tower cooling unit
d: discharge gap length

The invention claimed is:

1. An ozone generating device comprising a discharge unit configured to discharge a material gas which flows through a discharge space which is formed between two electrodes to generate ozone and a cooling unit configured to radiate heat which is generated by discharging,
wherein at least a portion of the material gas is obtained by vaporizing a liquefied raw material,
the cooling unit comprises a first cooling unit through which a first refrigerant flows in contact with at least one of the two electrodes and a second cooling unit which is provided further to a downstream side of flow of the material gas in the discharge unit than the first cooling unit, through which a second refrigerant flows in contact with at least one of the two electrodes, and in which a cold heat source is the liquefied raw material, and a temperature of the second refrigerant which is introduced to the second cooling unit is set to be lower than a temperature of the first refrigerant which is introduced to the first cooling unit.

2. The ozone generating device according to claim 1 wherein the second refrigerant is the liquefied raw material, the liquefied raw material vaporizes into gas, the gas is flown out from the second cooling unit and the gas is used as the material gas.

3. The ozone generating device according to claim 1 further comprising a heat exchanger which performs heat exchange between the second refrigerant and the liquefied raw material and the liquefied raw material which is vaporized by performing heat exchange is the material gas.

4. The ozone generating device according to claim 1 wherein the first refrigerant and the second refrigerant are the same material and the first cooling unit and the second cooling unit are configured to allow the first refrigerant to flow to the second cooling unit and the second refrigerant to flow to the first cooling unit.

5. The ozone generating device according to claim 1, wherein a discharge gap length of the discharge space at a side of downstream of flow of the material gas is set to be shorter than a discharge gap length of the discharge space at a side of upstream of flow of the material gas, and the second cooling unit is provided at the discharge unit whose discharge gap length is set to be shorter.

6. The ozone generating device according to claim 1, wherein the discharge unit is separated to be a first discharge unit and a second discharge unit, the first discharge unit and the first cooling unit configure a first ozone generating device, the second discharge unit and the second cooling unit configure a second ozone generating device, and an ozonized gas which is generated by the first ozone generating device is introduced to the second ozone generating device.

7. The ozone generating device according to claim 1, further comprising an ozone concentrator by which the ozone which is generated is adsorbed to an adsorbent which is cooled by using at least one portion of the liquefied raw material as the cold heat source so as to concentrate the ozone.

\* \* \* \* \*